(12) United States Patent
Tadinada et al.

(10) Patent No.: US 11,190,235 B2
(45) Date of Patent: Nov. 30, 2021

(54) LOW-POWER DIFFERENTIAL DATA TRANSMISSION SYSTEMS AND METHODS

(71) Applicant: SYNAPTICS INCORPORATED, San Jose, CA (US)

(72) Inventors: Aswani Tadinada, Serilingampalli (IN); Venkatasuryam Issa, Serilingampalli (IN); Jens Kristian Poulsen, Kitchener (CA)

(73) Assignee: SYNAPTICS INCORPORATED, San Jose, CA (US)

( * ) Notice: Subject to any disclaimer, the term of this patent is extended or adjusted under 35 U.S.C. 154(b) by 145 days.

(21) Appl. No.: 16/569,630

(22) Filed: Sep. 12, 2019

(65) Prior Publication Data

US 2020/0083926 A1    Mar. 12, 2020

(30) Foreign Application Priority Data

Sep. 12, 2018 (IN) .............................. 201841034377

(51) Int. Cl.
*H04B 3/38* (2006.01)
*H04B 3/56* (2006.01)
(Continued)

(52) U.S. Cl.
CPC .................. *H04B 3/38* (2013.01); *H04B 3/14* (2013.01); *H04B 3/46* (2013.01); *H04B 3/542* (2013.01); *H04B 3/56* (2013.01)

(58) Field of Classification Search
CPC ............ H04L 25/0272; H04L 25/0282; H04L 25/0294; H04L 25/03878; H03K 19/094; H02M 2001/0054; H03H 19/004; H04B 3/14; H04B 3/38; H04B 3/46; H04B 3/542; H04B 3/56
See application file for complete search history.

(56) References Cited

U.S. PATENT DOCUMENTS

2006/0066352 A1    3/2006 Davis et al.
2006/0220674 A1*  10/2006 Yeung ............ H03K 19/018528
                                                              326/29
(Continued)

FOREIGN PATENT DOCUMENTS

CN           102324922           1/2012

OTHER PUBLICATIONS

PCT Search Report and Written Opinion, PCT Patent Application No. PCT/US2019/050905, dated Jan. 2, 2020, 9 pages.

*Primary Examiner* — Khanh C Tran
(74) *Attorney, Agent, or Firm* — Paradice & Li LLP (57) ABSTRACT

Systems and methods for differential data transmission using an unterminated transmission line comprise a plurality of switches configured to control a differential voltage output on a pair of output lines, wherein the plurality of switches have a first state in which a high voltage is output on a first of the pair of output lines and a low voltage is output on a second of the pair of output lines, and wherein the plurality of switches have a second state in which the low voltage is output on the first of the pair of output lines and the high voltage is output on the second of the pair of output lines. A transition switch with an output impedance equal to that of the output lines will discharge the lines during a state transition so as to reduce to power consumption associated with changing states of the transmission line.

18 Claims, 6 Drawing Sheets

(51) Int. Cl.
 *H04B 3/46* (2015.01)
 *H04B 3/54* (2006.01)
 *H04B 3/14* (2006.01)

(56) References Cited

U.S. PATENT DOCUMENTS

| | | |
|---|---|---|
| 2006/0238037 A1* | 10/2006 | Oh .................... H04L 25/03878 307/409 |
| 2007/0229046 A1* | 10/2007 | Johnson ............... H03H 19/004 323/282 |
| 2007/0263749 A1 | 11/2007 | Teng et al. |
| 2009/0190648 A1 | 7/2009 | Sakano et al. |
| 2014/0210545 A1* | 7/2014 | Leibowitz ............... G05F 1/462 327/540 |
| 2015/0200791 A1 | 7/2015 | Huang |
| 2018/0054199 A1* | 2/2018 | Lin .................... H03K 17/6872 |
| 2018/0083624 A1* | 3/2018 | Tang .................... H04L 25/028 |
| 2019/0074026 A1* | 3/2019 | Poulsen ................ G10L 21/055 |

* cited by examiner

```
┌─────────────────────────────┐
│ Control a differential voltage output on │
│ a transmission line having a pair of │
│ output lines 610 │
└─────────────────────────────┘
              │
              ▼
┌─────────────────────────────┐
│ Selectively entering a first state in │
│ which a high voltage is output on a │
│ first of the pair of output lines and a │
│ low voltage is output on the second │
│ of the pair of output lines, and a │
│ second state in which a low voltage │
│ is output on the first of the pair of │
│ output lines and the high voltage is │
│ output on the second of the pair of │
│ output lines 620 │
└─────────────────────────────┘
              │
              ▼
┌─────────────────────────────┐
│ Activating a transition switch to │
│ redistribute charges between the pair │
│ of output lines during a state │
│ transition │
│ 630 │
└─────────────────────────────┘
```

```
┌─────────────────────────────┐
│ Control Elements/ │
│ System Components │
│ 680 │
└─────────────────────────────┘
              ┆
              ▼
┌─────────────────────────────┐
│ Differential Data │
│ Transmitter │
│ 670 │
└─────────────────────────────┘
```

Fig. 6A         Fig. 6B

LOW-POWER DIFFERENTIAL DATA TRANSMISSION SYSTEMS AND METHODS

CROSS-REFERENCE TO RELATED APPLICATIONS

This application claims priority to and the benefit of India Provisional Patent Application No. 201841034377 filed Sep. 12, 2018 and entitled "LOW-POWER DIFFERENTIAL DATA TRANSMITTER AND TRANSMISSION SCHEME USING CHARGE REDISTRIBUTION", which is hereby incorporated by reference in its entirety.

TECHNICAL FIELDS

The present disclosure relates generally to data communications and, more particularly, for example, to systems and methods for communication of digital data between devices.

BACKGROUND

There is a continued need in the art for improved data communications systems and methods, including circuits and components that reduce power consumption without degrading link performance for data recovery.

SUMMARY

The present disclosure addresses needs in the art for improved data communications systems and methods for use in low power devices. In various embodiments, improvements in differential transmitters are disclosed that reduce the transmitter power consumption without degrading the link performance for data recovery.

In various embodiments, a differential data transmitter includes a plurality of switches configured to control a differential voltage output on an unterminated transmission line comprising a pair of output lines. The plurality of switches have a first state in which a high voltage is output on a first of the output lines and a low voltage is output on a second of the output lines, and a second state in which the low voltage is output on the first of the output lines and the high voltage is output on the second output of the output lines. A transition switch is provided to discharge the output lines during a state transition.

The transition switch may be configured to close for a certain duration to bring the voltages of the pair of output lines to approximately one-half of a total voltage on the pair of output lines. The transition switch may be closed for a duration that is at least two times a delay of signals from a start of the unterminated transmission line to an end of the unterminated transmission line thereby discharging the unterminated transmission line before sending out a symbol with a new value. The transition switch may be coupled between the pair of output lines and have an output impedance matched to the pair of output lines. The differential data transmitter is configured such that when the transition switch is activated a voltage drop on one of the pair of output lines is approximately equal to a voltage rise on the other of the pair of output lines. The differential data transmitter may further include a capacitor, such as a piezoelectric capacitor, coupled between the pair of output lines.

In some embodiments, the differential data transmitter includes matching resistors arranged in series with the switches. The differential data transmitter may be implemented in an H-bridge driver circuit where the plurality of switches includes a plurality of transistor switches, and the transition switch includes a shorting switch having a plurality of transistors configured to function as a transmission gate. The differential data transmitter may be configured to output at a third voltage level. In some embodiments, the each of the plurality of switches is an NMOS transistor, and a data level is maintained at a lower voltage than a threshold voltage for the NMOS transistors thereby reducing leakage.

In various embodiments, a method includes operating a differential data transmitter comprising a plurality of switches, controlling a differential voltage output on an unterminated transmission line comprising a pair of output lines including entering a first state in which a high voltage is output on a first of the pair of output lines and a low voltage is output on a second of the pair of output lines, and entering a second state in which the low voltage is output on the first of the pair of output lines and the high voltage is output on the second of the pair of output lines, and redistributing charges between the pair of output lines during a state transition using a transition switch.

The method may further include absorbing the charges by closing the transition switch for a certain duration to bring the voltages of the pair of output lines to approximately one-half a total voltage on the pair of output lines, closing the transition switch for a duration that is at least equal to two times a propagation time from input to output of the transmission line, and/or coupling the transition switch between the pair of output lines including a series resistor such that an output resistance of the transition switch and the series resistor is equal to an input impedance of the transmission line. When the transition switch is activated, the method may include discharging the transmission line when the data changes value. The plurality of switches may include NMOS transistors, and the method further includes maintaining an input voltage at less than a threshold voltage of the NMOS transistors, thereby reducing leakage for the differential data transmitter.

In some embodiments, the method further includes matching resistors provided in series with each of the switches. The method may further include providing a differential data transmitter including an H-bridge driver circuit, providing the transition switch including a shorting switch having a plurality of transistors configured to function as a transmission gate. The differential data transmitter may be configured to output at a third voltage level.

The scope of the present disclosure is defined by the claims, which are incorporated into this section by reference. A more complete understanding of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, where showings therein are for purposes of illustrating embodiments of the present disclosure and not for purposes of limiting the same. The components in the drawings are not necessarily to scale, emphasis instead being placed upon clearly illustrating the principles of the present disclosure.

DETAILED DESCRIPTION

The present disclosure provides systems and methods that address needs in the art for improved differential data transmitters. In various embodiments, a reduction in differential transmitter power consumption is achieved without degrading the link performance or data recovery. In some embodiments, for example, an improved differential transmitter design allows for lower power consumption by the differential transmitter as compared to conventional differential transmitters by reducing the power dissipation to approximately half. Various embodiments may further reduce electromagnetic interference (EMI) by lowering spectral energy at higher frequencies. In various embodiments, the design area impact is minimal (e.g., may require a slightly larger design area), allowing the embodiments disclosed herein to be used in many existing implementations. It will be appreciated that the approaches disclosed herein may be applied to different types of differential transmission architectures.

Figure 1:
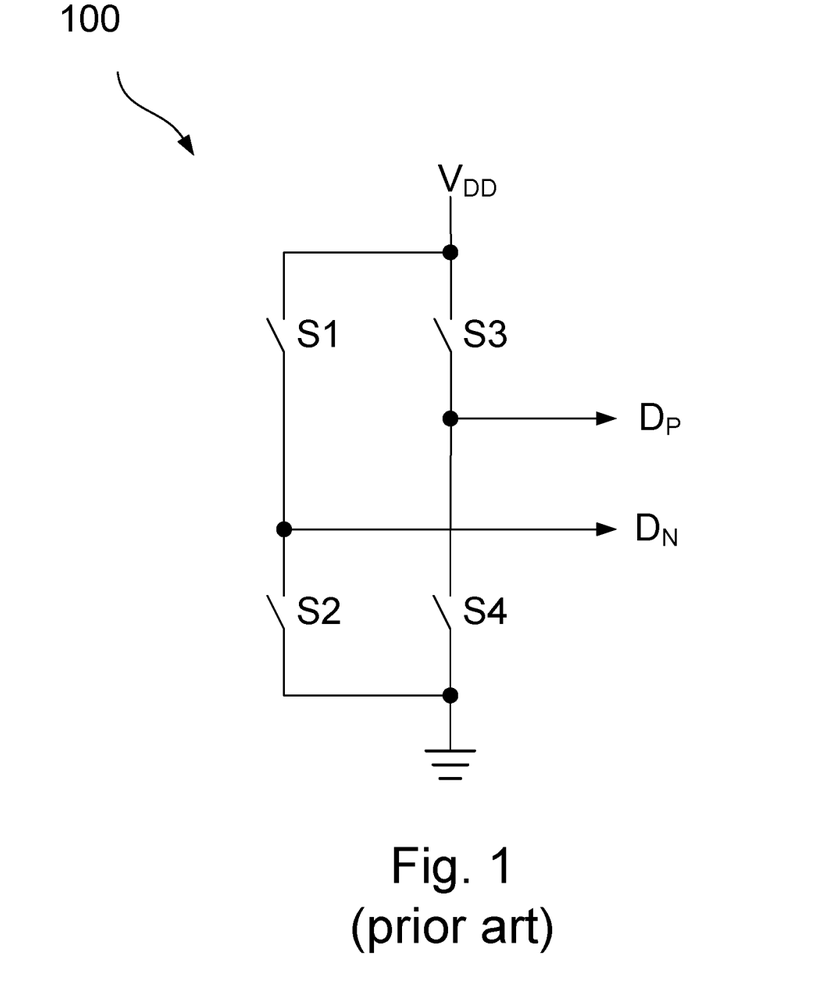
FIG. 1 illustrates an example schematic diagram of a conventional transmitter.

Referring to FIG. 1, a conventional differential transmitter 100 that is connected to an unterminated (open-ended) transmission line will now be described. The conventional differential transmitter 100 is configured to control a plurality switches (S1, S2, S3, and S4) to send a high voltage ($V_{high}$) on one line ($D_P$ or $D_N$) and a low voltage ($V_{low}$) on the second line. When $D_P=V_{high}=V_{DD}$ and $D_N=V_{low}=GND$ (e.g., when switches S3 and S2 are closed) the data transmitted from the differential transmitter, Tx, to the receiver, Rx, is received as logic "High". If $D_N=V_{high}$ and $D_P=V_{low}$ (e.g., when switches S1 and S4 are closed) then the data transmitted from the differential transmitter, Tx, to the differential receiver, Rx, is received as logic "Low". This scheme is commonly used in many data transmission standards. The switches often include a series resistor in order to match the input impedance of the transmission line. The energy dissipated in this scheme can be estimated as follows:

$$\text{Energy\_conventional} = I*U*\Delta T$$

where I is the current, U is signaling voltage and $\Delta T$ is the symbol period. Notice, if $\Delta T>2L/c$, where L is the length of the transmission line and c is the speed of electromagnetic waves in the transmission line, the line will be fully charged and there will no longer flow any currents. The current I can be found from $I=(U+U)/(2Z_0)=U/Z_0$, where $Z_0$ is the impedance of the transmission line, for the case of a transmission line, that has already been charged to the opposite symbol value.

Figure 2:
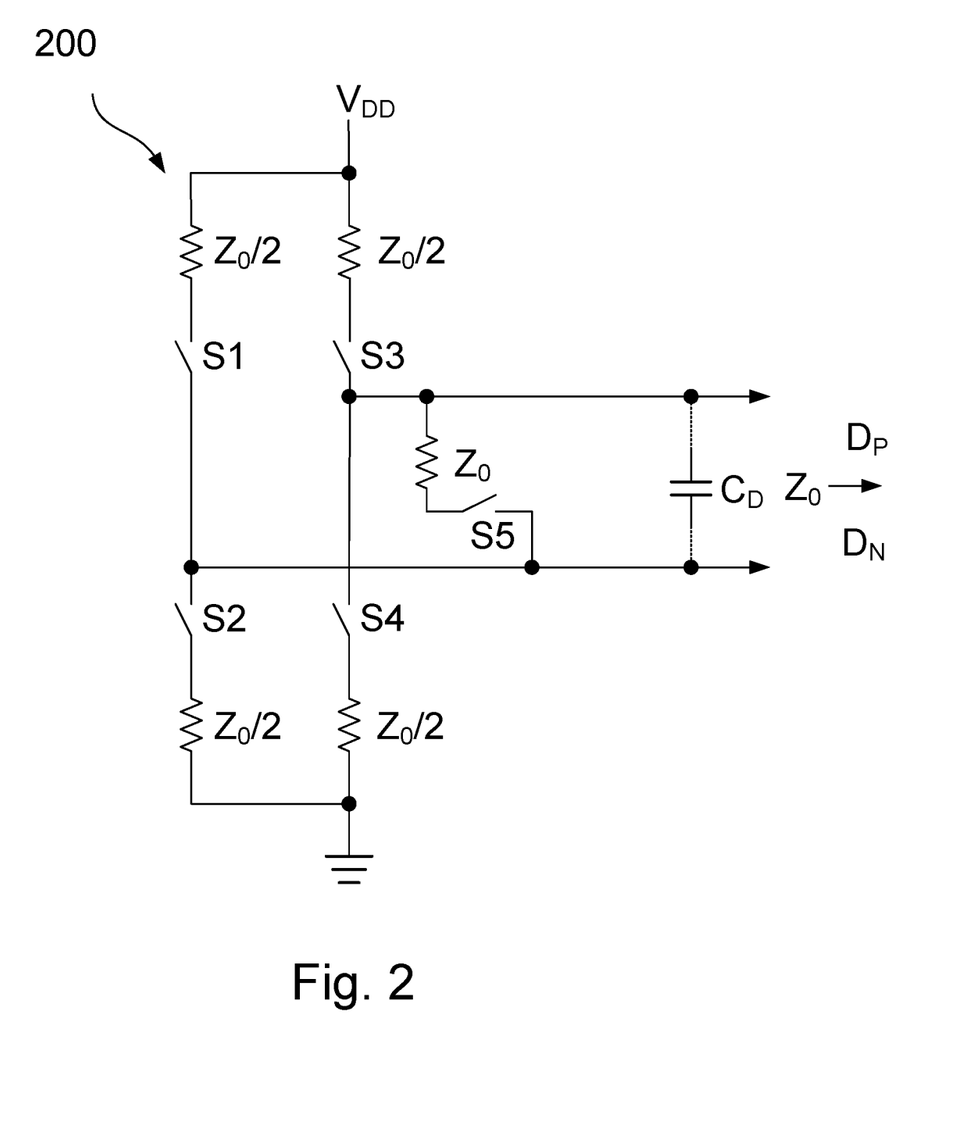
FIG. 2 illustrates an example schematic diagram of a differential data transmitter, in accordance with one or more embodiments of the disclosure.

Various embodiments of the present disclosure will now be described with reference to FIGS. 2-6. FIG. 2 illustrates a differential data transmitter in accordance with one or more embodiments of the disclosure. In this embodiment, differential data transmission utilizes the pre-charged nodes charged to one of the opposite levels corresponding to $V_{high}$ or $V_{low}$. In operation, when a data bit toggles to the opposite polarity, the voltages on $D_P$ and $D_N$ are flipped. In operation, $D_P$ is set to $V_{high}$ by closing switch S3 and $D_N$ is set to $V_{low}$ by closing switch S4. Similarly, $D_P$ is set to $V_{low}$ by closing switch S4 and $D_N$ is set to $V_{high}$ by closing switch S1. In one or more embodiments, the charges between $D_P$ and $D_N$ are absorbed by closing switch S5 for a certain duration to bring the voltages closer to $(V_{high}+V_{low})/2$ (or equal to or approximately equal to $(V_{high}+V_{low})/2$ in some embodiments) and hence discharging the transmission line between Tx and Rx. In various embodiments, the switch S5 is closed for a duration that is less than the unit interval, UI, in the digital communication system.

In some embodiments, the transmission line is discharged between data symbols when there is a new value of the data symbol (and otherwise not). Thus, there may not be any backward wave from the transmission line (e.g., the backward wave has a voltage of zero), and the current can now be found as $U/2Z_0$, or half of the previous case. This means that the energy consumption is half of the traditional case. In either case, there is no energy consumption associated with transmission of the same symbol, assuming the transmission medium is an unterminated transmission line.

The switch S5 may be configured to close only if the data level changes. If the same data value is transmitted, the switch S5 is not closed and the circuit is not activated at the start of the new data bit. Similarly, this circuit is not activated if another device has already pre-charged the data line to the desired value. In this case the circuit may be disabled to save power. In various embodiments, before and during activation of switch S5, the four switches S1-S4 are turned-off. The gating of switch S5 may be accomplished using a memory element that is enabled by a timing controller while the timing of the switches S1-S4 may be controlled using "break-before-make" delay circuits.

To minimize and/or avoid reflections of signals on the transmission line, the total series resistance of S5 and the resistor in series with the contact can be set close to the input impedance of the transmission line. Thus, if the input impedance of the transmission line is $Z_0$, the total resistance of the contact S5 and the series resistor can likewise be $Z_0$ to minimize reflections and ringing on the transmission line.

In some embodiments, the data includes an embedded clock for synchronization purposes, and the use of the circuit 200 may increase the jitter on clock and synchronization pulses or make it more susceptible to noise due to the use of a mid-level value during the transition. In these embodiments, the charge redistribution method disclosed herein is configured to be activated during transfer of data, but not during the transfer of clock/synchronization information. In this approach, many of the benefits of the circuit 200 are achieved while maintaining a clean clock edge for clock recovery circuits such as a phase locked-loop (PLL) or delay locked-loop (DLL). Thus, the circuit will not be activated just before or during the transfer of a synchronization symbol, but after this symbol and during all data transfers.

The circuit 200 provides an additional benefit over the prior art approach by reducing common mode ripple and, hence, reducing EMI. During a data transition, when the switch S5 is first activated, $D_P$ and $D_N$ track each other and the amount of voltage fall in one data line will be equal to amount of voltage rise in another data line. As a result, common mode is constant—$VCM=\{V(D_P)+VD(D_N)\}/2$—or ripple in VCM is zero, while in conventional circuits there may be slight differences in the charging and discharging times of the two lines due to circuit imperfections.

In one embodiment, when used to discharge a transmission line, the shorting switch, S5, may be connected in series with a resistor in series such that total resistance of switch and resistor is $Z_0$ (i.e. the input impedance of the transmission line).

Figure 3:
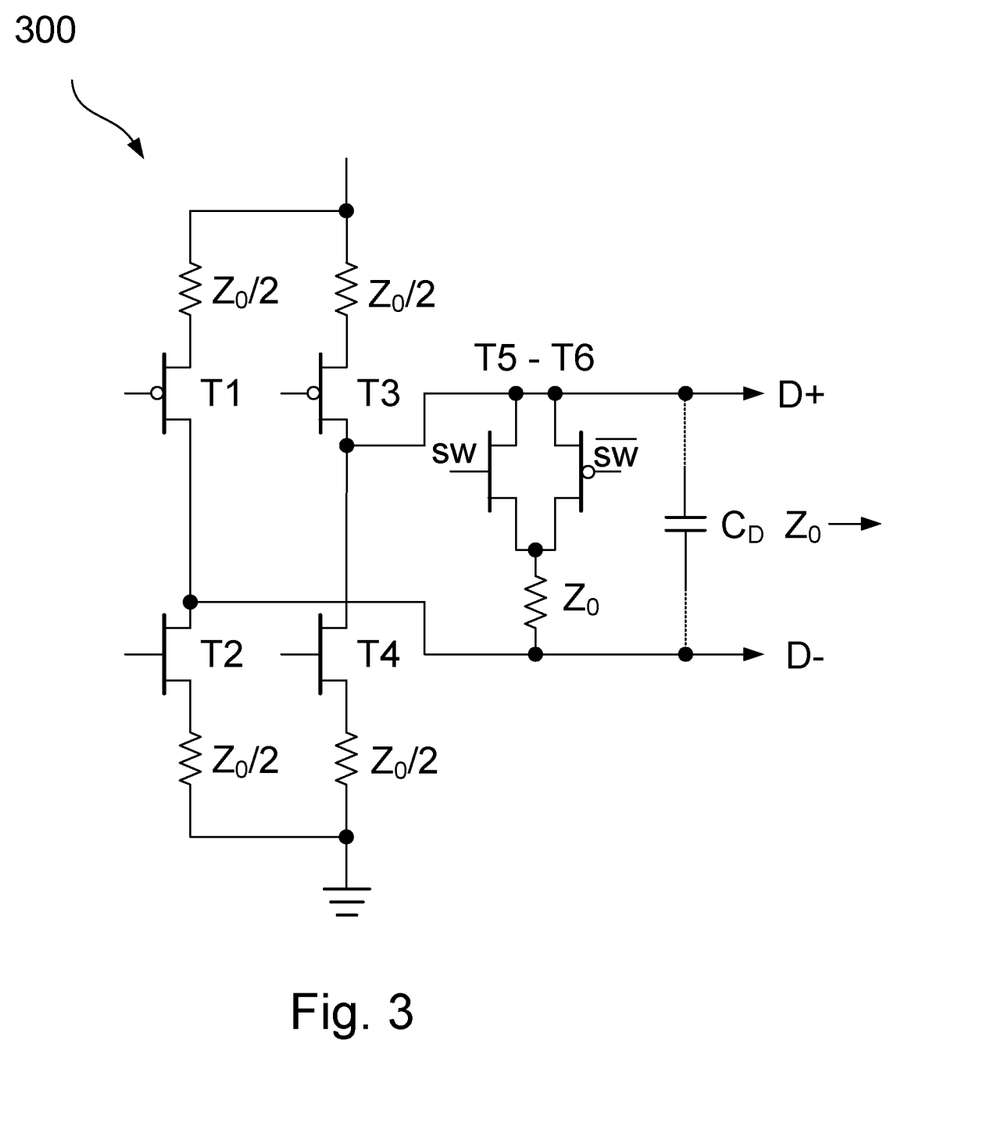
FIG. 3 illustrates an example schematic diagram of an H-bridge driver with reduced power consumption, in accordance with one or more embodiments of the disclosure.

FIG. 3 illustrates an example schematic of an H-bridge driver circuit 300 with reduced power consumption in accordance with one or more embodiments of the disclosure. As illustrated, transistor switches T1, T2, T3, and T4 control the high/low voltage output on D+ and D−. Matching resistors $Z_0/2$ are provided in series with the transistors, such that output impedance is the combined output impedance of the transistors and resistors. The transistors will have finite output impedance and this value may be subtracted from the impedance of the resistors. In some implementations, the resistors may be omitted altogether, depending on the desired impedance drive characteristics of the bridge. A shorting switch T5-T6 may be implemented as a transmission gate. In some embodiments, the bridge may be implemented using multiple drive elements and similarly for the switch T5-T6. The illustrated embodiment ensures almost constant output impedance, even when changing signal level and thereby reduces reflections from the transmitter and improves signal integrity. In various embodiments, the shorting switch T5-T6 is designed so the output impedance closely matches the impedance of the transmission line, thereby providing a good match for minimal ringing and quick settling.

Figure 4:
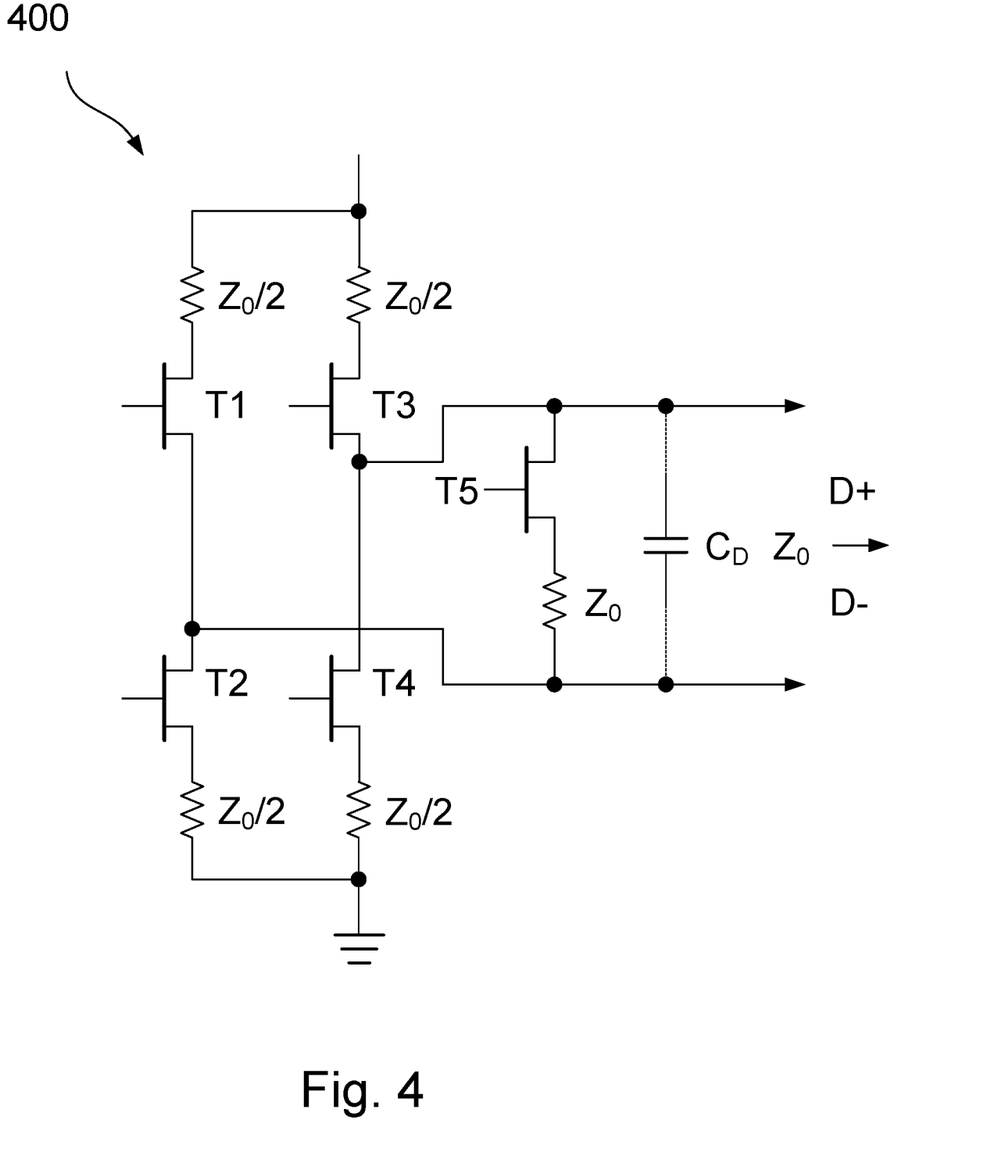
FIG. 4 illustrates an example schematic diagram a differential data transmitter using NMOS switches, in accordance with one or more embodiments of the disclosure.

FIG. 4 illustrates an example low power, low voltage implementation of a differential data transmitter 400 using NMOS switches, in accordance with one or more embodiments. In this embodiment, the switches T1, T2, T3, T4, and T5, are implemented using NMOS transistors. The differential data transmitter 400 offers reduced leakage and lower power consumption as compared to PMOS switches at the top due to low stray capacitances. This circuit is particularly well suited for low voltage applications where the top transistors are not activated due to the low signaling voltages, which happens when the voltage VDD is kept considerably lower than the threshold voltage VT. In one implementation, for example, VDD is less than VT/2. Thus, in an implementation where VT≈0.7 Volts, the signaling voltage may be kept below 350 mV. In this case, the transistors will be almost fully off regardless of the signaling voltage and the top NMOS transistors enable low power communications with reduced leakage and lower power consumption.

In some embodiments, a third voltage level may be implemented for more efficient bandwidth use. The third voltage level enables a higher baud rate even with the same clock rate. In operation, the third level would be possible after a true high or low level has been transmitted, thus, at most, every second symbol could be three-level. The gained efficiency in bandwidth can be calculated as log(2×3)/log (2)=1+log(3)/log(2)≈2.58 bits per two symbols. In other words, the gained efficiency is approximately 29% higher than direct encoding. In one embodiment, four symbols are used to encode up to five bits, where the two three-level symbols are used to encode a total of 9 states (e.g., 8 states used for communications and the last one is used for special states such as sync or error handling). This embodiment will give a coding efficiency of 1.25 bits/symbol or 25% better than direct encoding.

By utilizing a three-level symbol approach, the same signaling methodology of CATS signaling can be adopted, thereby reducing the EMI levels. This may be done, for example, by defining the same symbol twice as equal to a logic level of zero, while a level of one is signaled by the next symbol in the sequence {0, ½, 1, ½, 0, ½, 1, ½, 0, ½, etc.}. This sequence may ensure a lower fundamental frequency of the emitted symbols thereby lowering the EMI.

Figure 5:
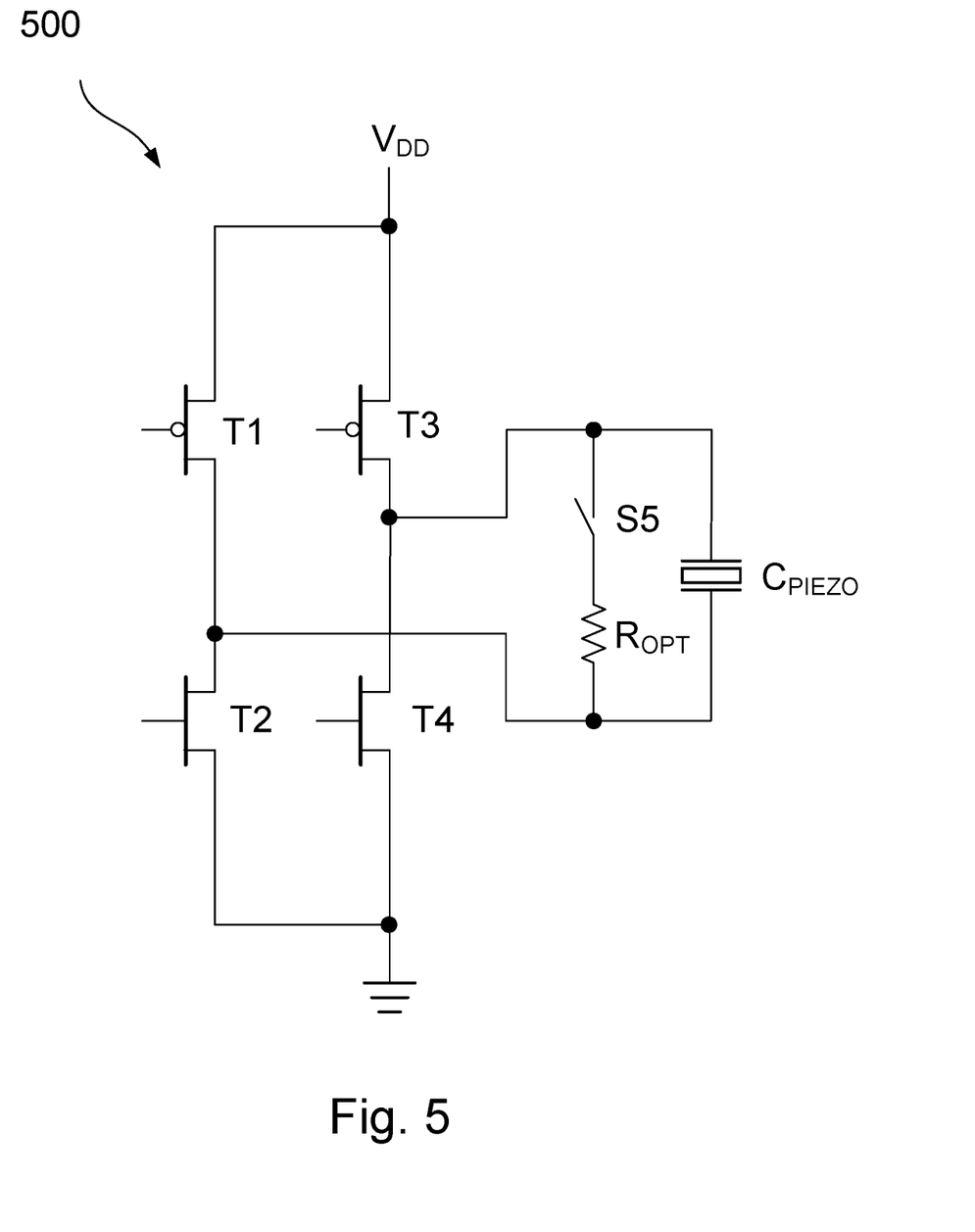
FIG. 5 illustrates an example schematic diagram of a low power piezoelectric driver, in accordance with one or more embodiments of the disclosure.

FIG. 5 illustrates an example schematic diagram of a low power piezoelectric driver 500 in accordance with one or more embodiments of the disclosure. In some embodiments, the circuit provides for efficient driving of piezoelectric speakers and piezoelectric drive elements. The piezoelectric drive element $C_{PIEZO}$ is characterized by a capacitive load and can therefore be advantageously controlled by the illustrated circuit arrangement. In various embodiments, the energy may be returned using resonant circuits (by including inductors and the like) to reduce the power consumption further in the circuit 500, though the illustrated embodiment uses the components as shown. Notice, since the piezoelectric element represents a lumped capacitance with internal dielectric losses, there may not be a need for a resistor in series with the control switch S5.

Figure 6A:
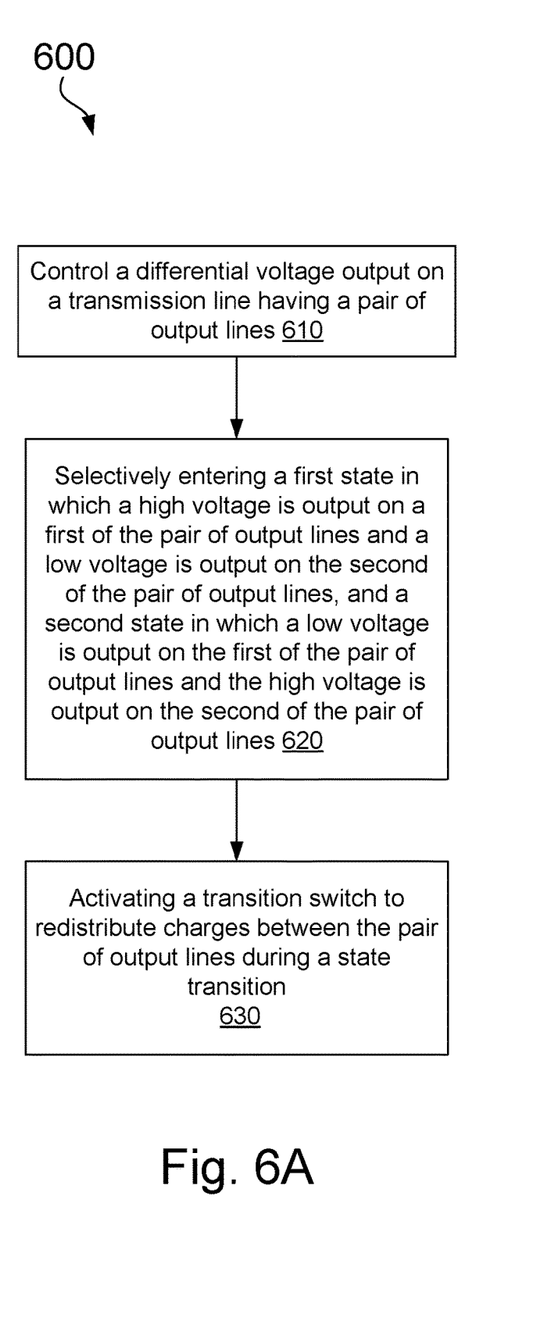
FIGS. 6A and 6B illustrate an example operation of a differential data transmitter, in accordance with one or more embodiments of the disclosure.
Figure 6B:
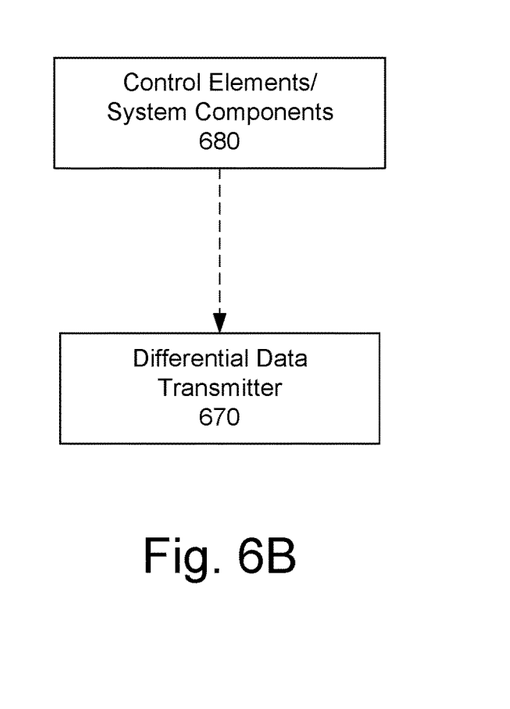

Referring to FIGS. 6A and 6B, an example operation of a differential data transmitter will now be described. In various embodiments, a differential data transmitter 670 may be controlled by a plurality of control elements and other system components 680 as described herein. In various embodiments, the control elements/system components 680 may be implemented through a combination of circuit components, logic components, firmware and/or software to control an operation of the differential data transmitter 670. For example, the control elements/system components 680 may include a voltage source, components for receiving and/or generating data values for transmission, a timing controller, delay circuits, one or more memory elements, a clock, a phase locked-loop (PLL), a delay locked-loop (DLL), and/or other components.

An example method 600 of operating the differential data transmitter 670 may be performed by the differential data transmitter 670 and one or more control elements/system components 680. In step 610, the differential data transmitter is operated to control a differential voltage output on an unterminated transmission line comprising a pair of output lines and the control includes transitioning between a first state and a second state in step 620. The method includes selectively entering the first state in which a high voltage is output on a first of the pair of output lines and a low voltage is output on a second of the pair of output lines, and selectively entering the second state in which the low voltage is output on the first of the pair of output lines and the high voltage is output on the second of the pair of output lines. The method further includes, in step 630, activating a transition switch to redistribute charges between the pair of output lines during a state transition. In some embodiments, the charges are absorbed by closing the transition switch for a duration (e.g., at least two times a propagation time from input to output of the transmission line in one embodiment) to bring the voltages of the pair of output lines to approximately one-half a total voltage on the pair of output lines.

The method may further include coupling the transition switch between the pair of output lines and configuring the transition switch through a series resistor such that an output resistance of the transition switch and the series resistor is approximately equal to an input impedance of the transmission line.

In various embodiments, the method 600 and differential data transmitter 670 may be implemented with one or more of the embodiments illustrated in FIGS. 2-5. The method may further include activating the transition switch to discharge the transmission line when the data changes value, providing matching resistors in series with each of the switches, providing an H-bridge driver circuit, and operating a transmission gate comprising a shorting switch having a plurality of transistors, providing a plurality of NMOS transistors and maintaining an input voltage at less than a threshold voltage of the NMOS transistors, thereby reducing leakage for the differential data transmitter, operating the differential data transmitter to output at a third voltage level, providing a piezoelectric driver between the pair of output lines, and/or other steps as disclosed herein.

The terminology used herein is for the purpose of describing particular embodiments and is not intended to be limiting of the present disclosure. It will be understood that when an element is referred to as being "connected to" or "coupled to" another element, it can be directly connected to or coupled to the other element, or one or more intervening elements may be present. In addition, it will also be understood that when an element is referred to as being "between" two elements, it can be the only element between the two elements, or one or more intervening elements may also be present.

As used herein, the terms "substantially," "about," "approximately" and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

The circuits, circuit components, electronic or electric devices and/or any other relevant devices or components according to embodiments of the present disclosure may be implemented utilizing any suitable hardware, firmware (e.g. an application-specific integrated circuit), software, or a combination thereof. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Also, a person of skill in the art should recognize that the functionality of various components may be combined or integrated into a single device or component, or the functionality of a particular device or component may be distributed across one or more other device or components without departing from the spirit and scope of the present disclosure.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A circuit comprising:
    a differential data transmitter comprising a plurality of switches configured to control a differential voltage output on an unterminated transmission line comprising a pair of output lines, wherein the plurality of switches have a first state in which a high voltage is output on a first of the output lines and a low voltage is output on a second of the output lines, and wherein the plurality of switches have a second state in which the low voltage is output on the first of the output lines and the high voltage is output on the second output of the output lines; and
    a transition switch configured to discharge the output lines during a state transition,
    wherein the transition switch is coupled between the pair of output lines and has an output impedance substantially matched to the pair of output lines.

2. The circuit of claim 1, wherein the transition switch is further configured to close the transition switch for a certain duration to bring the voltages of the pair of output lines to approximately one-half a total voltage on the pair of output lines.

3. The circuit of claim 1, wherein when the transition switch is activated, a voltage fall on one of the pair of output lines is approximately equal to a voltage rise on the other of the pair of output lines.

4. The circuit of claim 1, wherein the differential data transmitter comprises matching resistors provided in series with each of the switches.

5. The circuit of claim 1, wherein each of the plurality of switches comprises an NMOS transistor; and wherein a data level is maintained at a lower voltage than a threshold voltage for the NMOS transistors thereby reducing leakage.

6. The circuit of claim 1, wherein the differential data transmitter is configured to output at a third voltage level.

7. The circuit of claim 1, further comprising a capacitor coupled between the pair of output lines, wherein the capacitor is a piezoelectric capacitor.

8. A circuit comprising:
    a differential data transmitter comprising a plurality of switches configured to control a differential voltage output on an unterminated transmission line comprising a pair of output lines, wherein the plurality of switches have a first state in which a high voltage is output on a first of the output lines and a low voltage is output on a second of the output lines, and wherein the plurality of switches have a second state in which the low voltage is output on the first of the output lines and the high voltage is output on the second output of the output lines; and
    a transition switch configured to discharge the output lines during a state transition, wherein the transition switch is closed for a duration that is at least two times a delay of signals from a start of the unterminated transmission line to an end of the unterminated transmission line thereby discharging the unterminated transmission line before sending out a symbol with a new value.

9. A circuit comprising:
    a differential data transmitter comprising a plurality of switches configured to control a differential voltage output on an unterminated transmission line comprising a pair of output lines, wherein the plurality of switches have a first state in which a high voltage is output on a first of the output lines and a low voltage is output on a second of the output lines, and wherein the plurality of switches have a second state in which the low voltage is output on the first of the output lines and the high voltage is output on the second output of the output lines; and
    a transition switch configured to discharge the output lines during a state transition, wherein the differential data transmitter comprises an H-bridge driver circuit; wherein the plurality of switches comprises a plurality of transistor switches; and wherein the transition switch comprises a shorting switch having a plurality of transistors configured to function as a transmission gate.

10. A method comprising:
providing a differential data transmitter comprising a plurality of switches;
controlling a differential voltage output on an unterminated transmission line comprising a pair of output lines including transitioning between a first state and a second state;
selectively entering the first state in which a high voltage is output on a first of the pair of output lines and a low voltage is output on a second of the pair of output lines;
selectively entering the second state in which the low voltage is output on the first of the pair of output lines and the high voltage is output on the second of the pair of output lines;
activating a transition switch to redistribute charges between the pair of output lines during a state transition
providing an H-bridge driver circuit; and
operating a transmission gate comprising a shorting switch having a plurality of transistors.

11. The method of claim 10, further comprising absorbing the charges by closing the transition switch for a duration to bring the voltages of the pair of output lines to approximately one-half a total voltage on the pair of output lines.

12. The method of claim 10, wherein the transition switch is closed for a duration that is at least equal to two times a propagation time from input to output of the transmission line.

13. The method of claim 10, further comprising:
coupling the transition switch between the pair of output lines; and
configuring the transition switch through a series resistor such that an output resistance of the transition switch and the series resistor is approximately equal to an input impedance of the transmission line.

14. The method of claim 10, further comprising activating the transition switch to discharge the transmission line when the data changes value.

15. The method of claim 10, further comprising providing matching resistors in series with each of the switches.

16. The method of claim 10, further comprising operating the differential data transmitter to output at a third voltage level.

17. A method comprising:
providing a differential data transmitter comprising a plurality of switches;
controlling a differential voltage output on an unterminated transmission line comprising a pair of output lines including transitioning between a first state and a second state;
selectively entering the first state in which a high voltage is output on a first of the pair of output lines and a low voltage is output on a second of the pair of output lines;
selectively entering the second state in which the low voltage is output on the first of the pair of output lines and the high voltage is output on the second of the pair of output lines;
activating a transition switch to redistribute charges between the pair of output lines during a state transition;
providing a plurality of NMOS transistors; and maintaining an input voltage at less than a threshold voltage of the NMOS transistors, thereby reducing leakage for the differential data transmitter.

18. A method comprising:
providing a differential data transmitter comprising a plurality of switches;
controlling a differential voltage output on an unterminated transmission line comprising a pair of output lines including transitioning between a first state and a second state;
selectively entering the first state in which a high voltage is output on a first of the pair of output lines and a low voltage is output on a second of the pair of output lines;
selectively entering the second state in which the low voltage is output on the first of the pair of output lines and the high voltage is output on the second of the pair of output lines;
activating a transition switch to redistribute charges between the pair of output lines during a state transition; and
providing a piezoelectric driver between the pair of output lines.

* * * * *